(12) United States Patent
Reddy

(10) Patent No.: US 9,520,790 B2
(45) Date of Patent: Dec. 13, 2016

(54) INTERLEAVED LLC CONVERTERS AND CURRENT SHARING METHOD THEREOF

(71) Applicant: General Electric Company, Schenectady, NY (US)

(72) Inventor: Raghothama Reddy, Plano, TX (US)

(73) Assignee: General Electric Company, Schenectady, NY (US)

( * ) Notice: Subject to any disclaimer, the term of this patent is extended or adjusted under 35 U.S.C. 154(b) by 256 days.

(21) Appl. No.: 14/206,743

(22) Filed: Mar. 12, 2014

(65) Prior Publication Data

US 2014/0268906 A1 Sep. 18, 2014

Related U.S. Application Data

(60) Provisional application No. 61/793,848, filed on Mar. 15, 2013.

(51) Int. Cl.
*H02M 3/335* (2006.01)
*H02M 3/28* (2006.01)
*H02M 1/00* (2006.01)
*H02M 3/158* (2006.01)

(52) U.S. Cl.
CPC ............. *H02M 3/285* (2013.01); *H02M 3/335* (2013.01); *H02M 2001/0058* (2013.01); *H02M 2003/1586* (2013.01); *Y02B 70/1425* (2013.01); *Y02B 70/1491* (2013.01)

(58) Field of Classification Search
CPC ........ H02M 3/285; H02M 3/335; H02M 3/24; H02M 1/4241; H02M 2007/4815; H02M 2007/4811; H02M 2007/4826; H02M 2001/0067; H02M 2003/1586; Y02B 70/1416

See application file for complete search history.

(56) References Cited

U.S. PATENT DOCUMENTS

| 7,391,194 | B2 | 6/2008 | Brown |
| 8,274,799 | B2 | 9/2012 | Reinberger et al. |
| 8,300,429 | B2 | 10/2012 | Orr et al. |

(Continued)

OTHER PUBLICATIONS

International Search Report and Written Opinion from PCT Application No. PCT/US2014/028608 dated Jul. 28, 2014.

(Continued)

*Primary Examiner* — Gustavo Rosario Benitez
(74) *Attorney, Agent, or Firm* — General Electric Company

(57) ABSTRACT

Methods and systems for current sharing using interleaved LLC power converters are described herein. The method provides for current sharing between a first LLC power converter interleaved with a second LLC power converter. The method includes determining an expected output voltage for at least one of the first and second LLC power converters and measuring an output voltage of at least one of the first and second LLC power converters. The method also includes increasing a dead-time of at least one of the first and second LLC power converters when the measured output voltage exceeds the expected output voltage. Finally, the method includes interleaving the first and second LLC power converters, wherein an output current of the first LLC power converter is substantially equal to an output current of the second LLC power converter.

16 Claims, 3 Drawing Sheets

(56) References Cited

U.S. PATENT DOCUMENTS

| | | | |
|---|---|---|---|
| 8,553,430 B2* | 10/2013 | Melanson | H01F 3/10 363/21.03 |
| 2007/0086224 A1* | 4/2007 | Phadke | H02M 3/285 363/65 |
| 2010/0020569 A1* | 1/2010 | Melanson | H01F 3/10 363/21.03 |
| 2010/0123450 A1 | 5/2010 | Reddy et al. | |
| 2010/0328968 A1 | 12/2010 | Adragna et al. | |
| 2011/0090720 A1 | 4/2011 | Fujii | |
| 2011/0234191 A1* | 9/2011 | Yeon | H02M 3/156 323/285 |
| 2012/0153730 A1 | 6/2012 | Barnett et al. | |
| 2012/0236610 A1* | 9/2012 | Lee | H02M 3/285 363/65 |
| 2012/0262953 A1 | 10/2012 | Jungreis et al. | |
| 2012/0262955 A1 | 10/2012 | Yan et al. | |
| 2012/0287680 A1* | 11/2012 | Luo | H02M 3/33592 363/21.02 |
| 2013/0003431 A1 | 1/2013 | Reddy | |

OTHER PUBLICATIONS

Hyeon et al., "A Half Bridge LC Resonant Converter with Reduced Current Ripple of the Output Capacitor", undated, 5 pages, Seoul, Korea.

\* cited by examiner

Gain sweep of each tank element with fixed load resistence $Lr=11uH$
$L1=1.08*Lr$
$L2=0.92*Lr$
$Cr=66nF$
$C1=1.05*Cr$
$C2=0.95*Cr$
$Lm=90uH$
$Lm1=Lm2=Lm$

INTERLEAVED LLC CONVERTERS AND CURRENT SHARING METHOD THEREOF

CROSS REFERENCE TO RELATED APPLICATIONS

This application claims priority to U.S. Provisional Application No. 61/793,848 filed Mar. 15, 2013, which is hereby incorporated by reference in its entirety.

BACKGROUND

The field of the invention relates generally to power converters, and more specifically, to interleaved inductor-inductor-capacitor (LLC) converters.

Current isolated board-mounted power (BMP) designs are unable to achieve high efficiency because of hard switching topology limitations that cause high output ripple currents. One known method of reducing output ripple current is to interleave multiple LLC converters to use fewer output capacitors. Interleaving converters having different resonant tank gains is difficult due to tolerances in the converters' components because LLC converters are frequency controlled. When two LLC converters are driven within the tolerances at the same frequency, there are usually two different output voltages. Differing output voltages creates an inability to current share between the LLC converters.

BRIEF DESCRIPTION

In one embodiment, a method is provided for current sharing between a first LLC power converter interleaved with a second LLC power converter. The method includes determining an expected output voltage for at least one of the first and second LLC power converters and measuring an output voltage of at least one of the first and second LLC power converters. The method also includes increasing a dead-time of at least one of the first and second LLC power converters when the measured output voltage exceeds the expected output voltage. Finally, the method includes interleaving the first and second LLC power converters, wherein an output current of the first LLC power converter is substantially equal to an output current of the second LLC power converter.

In another embodiment, a system is provided that includes a first LLC power converter, and a second LLC power converter interleaved with the first LLC power converter. A dead-time of at least one of the first and the second LLC power converters is configured such that an output current of the first LLC power converter is substantially equal to an output current of the second LLC power converter.

In yet another embodiment, a method is provided of interleaving a first LLC power converter and a second LLC power converter. The method includes calibrating a dead-time for at least one of the first and second LLC power converters such that an output current of the first LLC power converter is substantially equal to an output current of the second LLC power converter. The method also includes coupling the first and second LLC power converters to a common load and coupling the first LLC power converter to a first power source and the second LLC power converter to a second power source.

DETAILED DESCRIPTION

Figure 1:
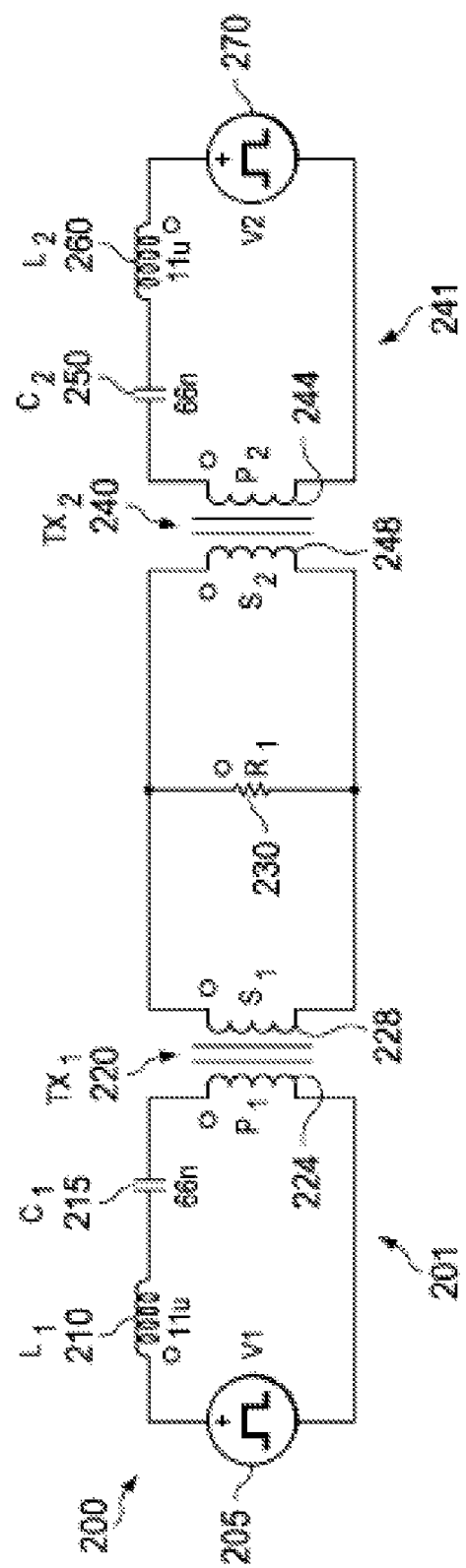
FIG. 1 is a block diagram of an exemplary system for an interleaving of a first LLC power converter and a second LLC power converter.

FIG. 1 is a block diagram of one embodiment of a system 200 for interleaving a first LLC power converter 201 and a second LLC power converter 241. In an exemplary embodiment, first LLC power converter 201 includes a first power source 205 that acts as an LLC power converter voltage source. More specifically, in an exemplary embodiment, first power source 205 is an equivalent Thevenin voltage source that generates a square wave voltage output. The square wave voltage output of first power source 205 may be measured across a junction of two Metal Oxide Semiconductor Field Effect Transistors ("MOSFETs") (not shown) of a bridge circuit. First LLC power converter 201 also includes a first resonant inductor 210 coupled to first voltage source 205, and a first resonant capacitor 215 coupled to first resonant inductor 210. First LLC power converter 201 also includes a first transformer 220 having a first magnetic inductor 224 coupled to first resonant capacitor 215 and is a primary winding of first transformer 220. First magnetic inductor 224 is also coupled to first power source 205. First transformer 220 also includes a secondary winding 228.

In an exemplary embodiment, second LLC power converter 241 includes a second power source 270. More specifically, in an exemplary embodiment, second power source 270 is an equivalent Thevenin voltage source that generates a square wave voltage output. The square wave voltage output of second power source 270 may be measured across a junction of two MOSFETs of a bridge circuit. Second LLC power converter 241 includes a second resonant inductor 260 coupled to second power source 270, and a second resonant capacitor 250 coupled to second resonant inductor 260. Second LLC power converter 241 also includes a second transformer 240 having a second magnetic inductor 244 coupled to second resonant capacitor 250 and is a primary winding of second transformer 240.

In an exemplary embodiment, secondary winding 228 of first transformer 220 is coupled in parallel to a common load 230. Secondary winding 248 of second transformer 240 is also coupled in parallel to common load 230. Common load 230 is magnetically couplable to first and second LLC power converters 201 and 241.

In some embodiments of system 200, for an interleaving to occur, first LLC power converter 201 and second LLC power converter 241 should output substantially the same amount of current so that common load 230 is driven by both LLC power converters 201 and 241. High inductive variation creates difficulties in interleaving LLC power converters. In an exemplary embodiment, by advantageously adjusting a dead-time of one or both of LLC power converters 201 and 241, system 200 interleaves LLC power converters 201 and 241 to operate at a substantially equal output current. In an exemplary embodiment, "dead-time" may be defined as a wait time between powering transformers 220 and 240 in a first direction and powering transformers 220 and 240 in a second direction to prevent a short of one of power sources 205 and 270. Additionally, or alternatively, dead-time may also be defined as a time when there are no active signals between the MOSFETs of the bridge circuit. The dead-time is obtained during calibration by comparing an open-loop response of each of LLC power converters 201 and 241 at nominal resonant frequency. The dead-time is increased for whichever of the first and second LLC power converters measures a higher output voltage when tested in open-loop.

In an exemplary embodiment, configuring LLC power converters 201 and 241 to current share includes determining an expected output voltage for at least one of LLC power converters 201 and 241. Determining an expected output voltage may include predicting an output voltage using a predetermined input voltage, a predetermined frequency, and/or a known load applied to each LLC power converter 201 and 241. An output voltage of one of LLC power converter 201 and LLC power converter 241 is then is measured. In some embodiments, measuring an output voltage includes measuring respective output voltages of each of first and second LLC power converters 201 and 241. The measured respective output voltages are compared to the expected values. When the measured output voltage exceeds the expected output voltage, the dead-time of the converter is increased. This process is repeated until the measured output voltage is substantially equal to the expected output voltage.

In an alternative embodiment, the output voltages of each of first and second LLC power converters 201 and 241 are measured and compared to each other. The dead-time is increased for whichever of first and second LLC power converters 201 and 241 measures a higher output voltage. Increasing the dead-time of a particular LLC power converter effectively lowers a gain for that converter.

In system 200, interleaving of LLC power converters 201 and 241 may occur by reducing variation of a ripple current between an output current of each of LLC power converters 201 and 241. Such a reduction enables system 200 to support a higher overall output current (i.e., through common load 230) through the interleaving of matched LLC power converters, than is generally available with conventional LLC power converters.

Figure 2:
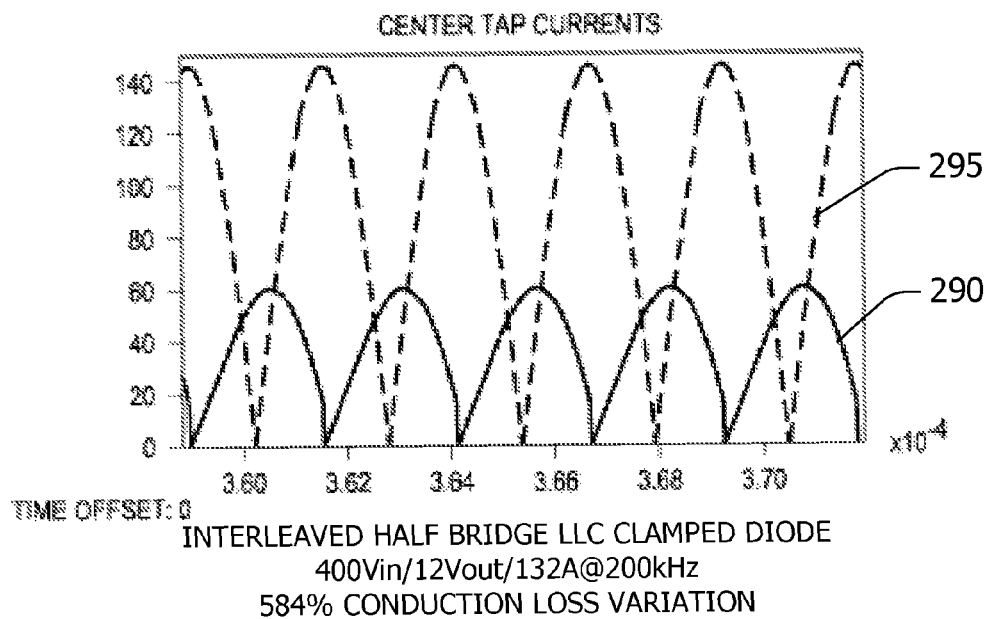
FIG. 2 is a graph of output currents of the exemplary interleaved LLC power converters shown in FIG. 1 without dead-time control.
Figure 3:
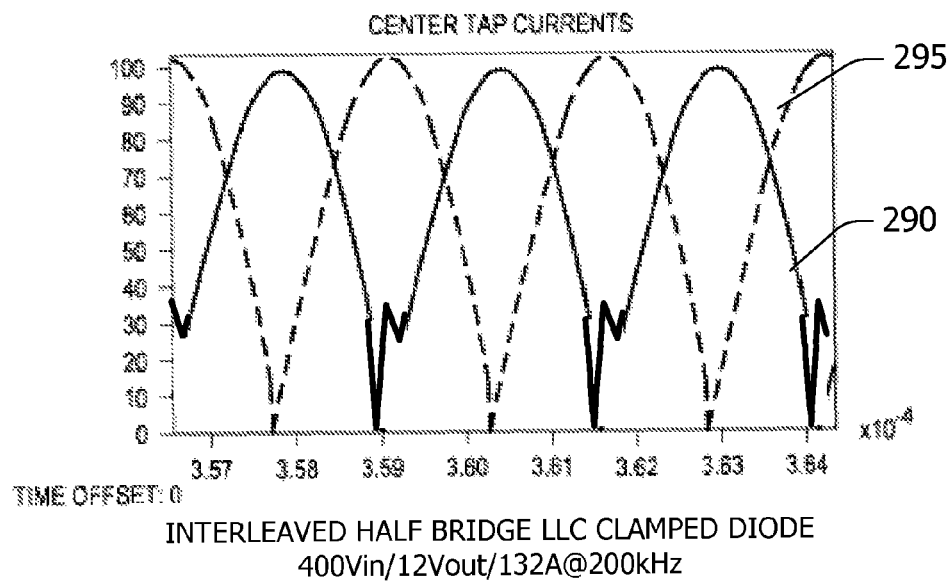
FIG. 3 is a graph of output currents of the exemplary interleaved LLC power converters shown in FIG. 1 with dead-time control.

FIG. 2 is a graph of output currents of exemplary interleaved LLC power converters 201 and 241 (shown in FIG. 1) without dead-time control. FIG. 3 is a graph of output currents of exemplary interleaved LLC power converters 201 and 241 with dead-time control. Output of first LLC power converter 201 is represented by curve 290 and output of second LLC power converter 241 is represented by curve 295. In an exemplary embodiment, first resonant inductor L1 210 has a value of 1.08×Lr and second resonant inductor L2 260 has a value of 0.92×Lr, wherein Lr is a given a value of a resonant inductance from which these inductance values vary. In FIGS. 3, L1 and C1 are configured to have a dead-time of 150 nanoseconds. L2 and C2 are configured to have a dead-time of 600 nanoseconds.

As illustrated in FIG. 3, an interleaving of LLC power converters 201 and 241 having substantially matched resonances shows that the current characteristics of the LLC power converter current waveforms are substantially similar, thereby enabling interleaving of LLC power converters 201 and 241. Generally, the interleaving of LLC power converters 201 and 241 lowers a variation of an aggregate output ripple current through a load in proportion to the number of interleaved LLC power converters 201 and 241. The similar waveforms are out of phase from one another by a fixed phase, which contributes to reducing average variation of current output. Having similar output current amplitudes results in system 200 having higher efficiency and higher current densities.

Figure 4:
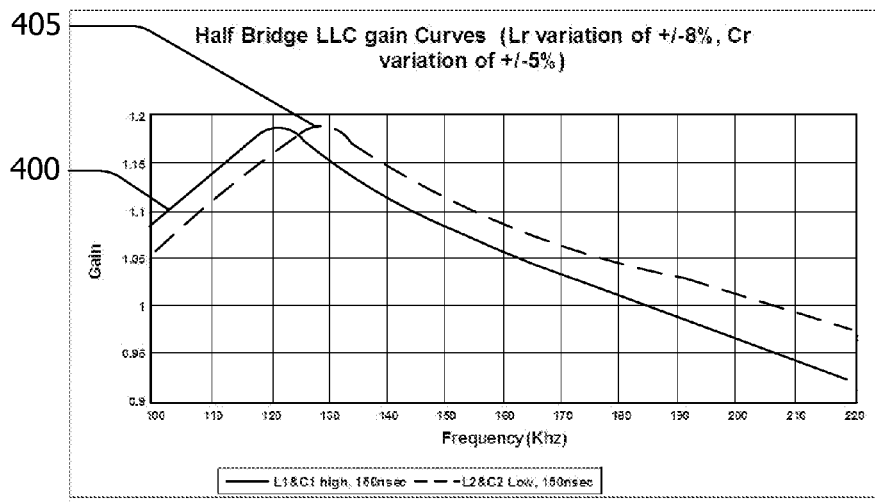
FIG. 4 is a graph of gain curves for the first and second LLC power converters shown in FIG. 1 for a fixed input and a fixed load.
Figure 5:
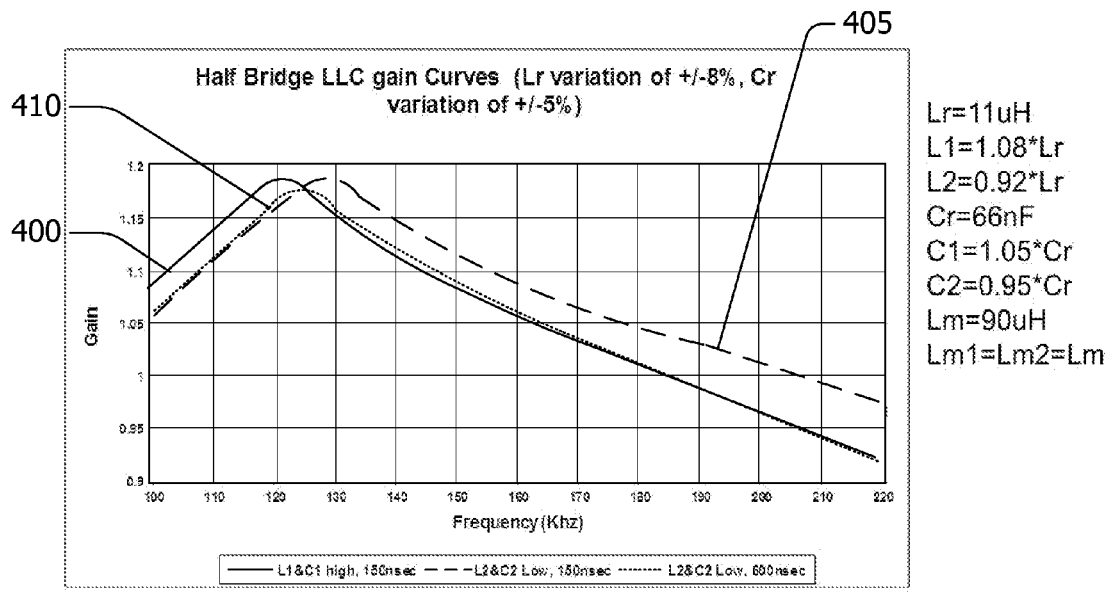
FIG. 5 is a graph of gain curves for the first and second LLC power converters shown in FIG. 1 with dead-time control.

FIG. 4 is a graph of gain curves for first and second LLC power converters 201 and 241 (shown in FIG. 1) for a fixed input and a fixed load. FIG. 5 is a graph of gain curves for first and second LLC power converters 201 and 241 (shown in FIG. 1) with dead-time control. The gain curves correspond to normalized DC output voltages and include a first normalized gain curve 400 associated with first LLC power converter 201 and a second normalized gain curve 405 associated with second LLC power converter 241. First and second normalized gain curves 400 and 405 include dead-times of 150 nanoseconds. FIG. 5 includes a third normalized gain curve 410 associated with LLC power converter 241. Third normalized gain curve 410 includes a dead-time of 600 nanoseconds. As illustrated in FIG. 5, applying a determined dead-time brings the gain curves closer together for LLC power converters 201 and 241. For a frequency range between about 125 kHz and 220 kHz, gain curves 400 and 410 are substantially equal.

A technical effect of the systems and methods described herein includes at least one of: (a) determining an expected output voltage for at least one of a first and a second LLC power converter for a predetermined set of operating conditions; (b) measuring an actual output voltage of at least one of the first and second LLC power converters by applying the operating conditions; (c) increasing a dead-time of at least one of the first and second LLC power converters when the actual output voltage exceeds the expected output voltage; and (d) interleaving the first and second LLC power converters, wherein an output current of the first LLC power converter is substantially equal to an output current of the second LLC power converter.

Exemplary embodiments of systems and methods for current sharing between a first inductor-inductor-capacitor (LLC) power converter interleaved with a second LLC power converter are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of current sharing between a first inductor-inductor-capacitor (LLC) power converter interleaved with a second LLC power converter, said method comprising:
   operating the first and second LLC power converters at a nominal resonant frequency in an open loop during a calibration of the first and second LLC power converters;
   measuring an open loop output voltage of the first and second LLC power converters;
   determining which of the first and second LLC power converters outputs a higher measured open loop output voltage;
   increasing a dead-time of whichever of the first and second LLC power converters outputs the higher open loop output voltage to calibrate the first and second LLC power converters; and
   operating the calibrated first and second LLC power converters in a normal operating mode, wherein an output current of the first LLC power converter is substantially equal to an output current of the second LLC power converter.

2. The method according to claim 1, further comprising predicting the open loop output voltage using at least one of a predetermined input voltage, a predetermined frequency, and a known load.

3. The method according to claim 1, wherein the increasing the dead-time of whichever of the first and second LLC converters outputs the higher open loop output voltage further comprises increasing the dead-time of whichever of the first and second LLC power converters outputs the higher open loop output voltage until the measured open loop output voltage is substantially equal to an expected output voltage.

4. The method according to claim 1, further comprising:
   coupling the first LLC power converter to a common load;
   coupling the second LLC power converter to the common load; and
   driving the common load using output current from both the first and second LLC power converters.

5. The method according to claim 1, wherein the operating the calibrated first and second LLC power converters the normal operating mode further comprises reducing variation of a ripple current between the output current of each of the first and second LLC power converters.

6. A system comprising:
   a first inductor-inductor-capacitor (LLC) power converter; and
   a second LLC power converter interleaved with said first LLC power converter, wherein said first and second LLC power converters are calibrated to output substantially equal output currents, the calibration comprising:
   operating said first and second LLC power converters at a nominal resonant frequency in an open loop;
   measuring an open loop output voltage of said first and second LLC power converters;
   determining which of said first and second LLC power converters outputs a higher measured open loop output voltage; and
   increasing a dead-time of whichever of said first and second LLC power converters outputs the higher open loop output voltage.

7. The system according to claim 6, wherein said first and second LLC power converters are configured to be coupled to a common load.

8. The system according to claim 7, wherein each of said first and second LLC power converters is configured to operably provide a substantially equal amount of power to drive the common load.

9. The system according to claim 6, wherein said first LLC power converter is configured to be operably coupled to a first power source and said second LLC power converter is configured to be operably coupled to a second power source.

10. The system according to claim 9, wherein said first LLC power converter comprises a first magnetic inductor, and wherein said second LLC power converter comprises a second magnetic inductor.

11. The system according to claim 10, wherein said first magnetic inductor comprises a primary winding of a first transformer, and wherein said second magnetic inductor comprises a primary winding of a second transformer.

12. The system according to claim 10, wherein said first LLC power converter comprises a first resonant inductor coupled between the first power source and said first magnetic inductor, and wherein said second LLC power converter comprises a second resonant inductor coupled between the second power source and said second magnetic inductor.

13. The system according to claim 12, wherein said first LLC power converter comprises a first resonant capacitor coupled between said first resonant inductor and said first magnetic inductor, and wherein said second LLC power converter comprises a second resonant capacitor coupled between said second resonant inductor and said second magnetic inductor.

14. A method of interleaving a first inductor-inductor-capacitor (LLC) power converter and a second LLC power converter, said method comprising:
   operating the first and second LLC power converters at a nominal resonant frequency in an open loop during a calibration of the first and second LLC power converters;
   measuring an open loop output voltage of the first and second LLC power converters;
   determining which of the first and second LLC power converters outputs a higher measured open loop output voltage;
   increasing a dead-time of whichever of the first and second LLC power converters outputs the higher open loop output voltage;
   coupling the first and second LLC power converters to a common load;
   coupling the first LLC power converter to a first power source and the second LLC power converter to a second power source; and
   operating the calibrated first and second LLC power converters in a normal operating mode, wherein an output current of the first LLC power converter is substantially equal to an output current of the second LLC power converter.

15. The method according to claim 14, wherein the increasing the dead-time for whichever of the first and second LLC power converters outputs the higher open loop output voltage comprises:
- determining an expected output voltage for at least one of the first and second LLC power converters;
- measuring an output voltage of at least one of the first and second LLC power converters; and
- increasing the dead-time of at least one of the first and second LLC power converters when the measured output voltage exceeds the expected output voltage.

16. The method according to claim 15, wherein the measuring the open loop output voltage comprises measuring respective output voltages of each of the first and second LLC power converters, said method further comprising:
- comparing the measured respective output voltages of the first and second LLC power converters;
- wherein the increasing the dead-time of at least one of the first and second LLC power converters comprises increasing the dead-time for whichever of the first and second LLC power converters measures a higher output voltage.

* * * * *